(12) United States Patent
Jung et al.

(10) Patent No.: US 10,085,298 B2
(45) Date of Patent: Sep. 25, 2018

(54) METHOD WHEREBY TERMINALS TRANSMIT DEVICE-TO-DEVICE (D2D) SIGNALS IN WIRELESS COMMUNICATION SYSTEM

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 15/025,246

(22) PCT Filed: Sep. 26, 2014

(86) PCT No.: PCT/KR2014/009056
§ 371 (c)(1),
(2) Date: Mar. 25, 2016

(87) PCT Pub. No.: WO2015/046972
PCT Pub. Date: Apr. 2, 2015

(65) Prior Publication Data
US 2016/0219640 A1     Jul. 28, 2016

Related U.S. Application Data

(60) Provisional application No. 61/883,165, filed on Sep. 26, 2013, provisional application No. 61/935,849, filed on Feb. 5, 2014.

(51) Int. Cl.
H04W 72/04     (2009.01)
H04W 76/14     (2018.01)
(Continued)

(52) U.S. Cl.
CPC .......... *H04W 76/14* (2018.02); *H04B 17/318* (2015.01); *H04W 72/02* (2013.01); *H04W 76/023* (2013.01)

(58) Field of Classification Search
CPC ... H04W 76/023; H04W 72/10; H04W 72/02; H04W 72/04; H04W 92/18
(Continued)

(56) References Cited

U.S. PATENT DOCUMENTS

2005/0094600 A1 * 5/2005 Zhang .................. H04L 1/1887
370/331
2006/0265470 A1 * 11/2006 Rolia .................... G06F 9/5027
709/217
(Continued)

FOREIGN PATENT DOCUMENTS

WO     2012/159270 A1    11/2012
WO     WO 2012159270 A1 * 11/2012 .......... H04W 72/048
(Continued)

OTHER PUBLICATIONS

PCT International Application No. PCT/KR2014/009056, International Search Report dated Dec. 24, 2014, 1 page.

*Primary Examiner* — Charles C Jiang
*Assistant Examiner* — Will Lin
(74) *Attorney, Agent, or Firm* — Lee Hong Degerman Kang & Waimey

(57) ABSTRACT

Provided are a method whereby terminals transmit device-to-device (D2D) signals in a wireless communication system, and terminals for supporting the method. The method comprises: identifying multiple resource pools capable of transmitting D2D signals; and selecting a particular resource pool from among the multiple resource pools, wherein the D2D signals are transmitted by using the resources of the selected particular resource pool.

11 Claims, 15 Drawing Sheets

(51) Int. Cl.
  *H04W 72/02* (2009.01)
  *H04B 17/318* (2015.01)
  *H04W 76/02* (2009.01)
(58) Field of Classification Search
  USPC .................................................. 370/329, 330
  See application file for complete search history.

(56) References Cited

U.S. PATENT DOCUMENTS

| | | | | |
|---|---|---|---|---|
| 2008/0102784 | A1* | 5/2008 | Mittal .................... | H04M 11/04 455/404.1 |
| 2011/0106952 | A1* | 5/2011 | Doppler ............ | H04W 72/0406 709/226 |
| 2011/0312331 | A1* | 12/2011 | Hakola ............... | H04W 72/085 455/452.2 |
| 2012/0051315 | A1 | 3/2012 | Wang et al. | |
| 2012/0243431 | A1* | 9/2012 | Chen ................. | H04W 72/0406 370/252 |
| 2013/0109301 | A1 | 5/2013 | Hakola et al. | |
| 2014/0094183 | A1* | 4/2014 | Gao .................... | H04W 72/048 455/450 |
| 2014/0328329 | A1* | 11/2014 | Novlan ............... | H04W 72/042 370/336 |
| 2015/0045018 | A1* | 2/2015 | Liu .......................... | H04L 1/00 455/426.1 |
| 2015/0056982 | A1* | 2/2015 | Sorrentino ............ | H04W 60/00 455/426.1 |
| 2016/0073425 | A1* | 3/2016 | Xu ....................... | H04W 72/042 370/329 |
| 2017/0238308 | A1* | 8/2017 | Tiirola .............. | H04W 72/0413 370/329 |
| 2018/0110027 | A1* | 4/2018 | Mochizuki .............. | H04W 4/70 |

FOREIGN PATENT DOCUMENTS

| | | |
|---|---|---|
| WO | 2013/112031 A1 | 8/2013 |
| WO | 2013/125873 A1 | 8/2013 |

* cited by examiner

METHOD WHEREBY TERMINALS TRANSMIT DEVICE-TO-DEVICE (D2D) SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2014/009056, filed on Sep. 26, 2014, which claims the benefit of U.S. Provisional Application Nos. 61/883,165, filed on Sep. 26, 2013, and 61/935,849, filed on Feb. 5, 2014, the contents of which are all hereby incorporated by reference herein in their entirety.

BACKGROUND OF THE INVENTION

Field of the Invention

The present invention relates to wireless communication and, more particularly, to a D2D signal transmission method of user equipment in a wireless communication system and a device supporting the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D communication.

D2D communication may have various advantages in that it is communication between devices in proximity. For example, D2D UE has a high transfer rate and a low delay and may perform data communication. Furthermore, in D2D communication, traffic concentrated on a base station can be distributed. If D2D UE plays the role of a relay, it may also play the role of extending coverage of a base station.

Meanwhile, one of important procedures when D2D communication is performed is to discover another device in proximity. To this end, D2D UE sends a discovery request signal (it may be hereinafter called a discovery request signal), and another D2D UE may send a discovery response signal in response to the discovery request signal.

Furthermore, in D2D communication, direct communication may be performed between two types of UE.

Meanwhile, in D2D communication, a resource pool in which a D2D signal is transmitted may be configured for each cell. In this case, it is necessary to define that UE has to select a resource pool for which cell and to send a D2D signal. Furthermore, when UE selects a resource pool for a neighbor cell and sends a D2D signal, if the resource pool for the neighbor cell is different from a resource pool configured by a serving cell, interference with the serving cell attributable to the D2D signal is generated.

Accordingly, there is a need for a method for enabling devices which will perform D2D communication to efficiently send D2D signals and a device supporting the same.

SUMMARY OF THE INVENTION

The present invention provides a method for sending D2D signals in a wireless communication system and a device supporting the same.

In an aspect, a device to device (D2D) signal transmission method of user equipment in a wireless communication system is provided. The method comprises identifying a plurality of resource pools capable of sending D2D signals and selecting a specific resource pool of the plurality of resource pools, wherein the D2D signal is transmitted using a resource of the selected specific resource pool.

The method further comprises receiving resource selection information indicative of the plurality of resource pools.

Each of the plurality of resource pools is a resource pool configured in each cell in order to send a D2D signal.

The method further comprises measuring received power of signals transmitted by a serving cell of the user equipment and neighbor cells, and determining a cell having a highest received power based on the measurement.

The selected specific resource pool is a resource pool configured in the cell having the highest received power.

If the cell having the highest received power is a first neighbor cell of the neighbor cells, the D2D signal is transmitted using resources common to a resource pool configured in the serving cell and a resource pool configured in the first neighbor cell.

Each of the plurality of resource pools has priority, and the selected specific resource pool is a resource pool having a highest priority.

Priorities of the plurality of resource pools are determined based on priorities of cells in which respective resource pools have been configured.

The method further comprises receiving received power of signals transmitted by a serving cell of the user equipment and neighbor cells, and selecting cells providing received power of a predetermined critical value or more based on the measurement.

The selected specific resource pool is a resource pool configured in a cell which belongs to the cells providing the received power of the predetermined critical value or more and which has a highest priority.

The plurality of resource pools has priorities, and if the D2D signals comprises a plurality of types, different types of the D2D signals have different priorities.

The priorities of the plurality of resource pools and the priorities of the D2D signals are associated.

In another aspect, a user equipment capable of sending a device to device (D2D) signal in a wireless communication system is provided. The user equipment comprises a Radio Frequency (RF) unit sending and receiving radio signals and a processor operatively connected to the RF unit, wherein the processor identifies a plurality of resource pools capable of sending D2D signals and selects a specific resource pool of the plurality of resource pools, wherein the user equipment sends a D2D signal using a resource of the selected specific resource pool.

In accordance with the present invention, UE selects a resource pool for a specific cell and sends a D2D signal. In this case, the specific cell may be a resource pool configured for a cell having the best quality. If the specific cell is a neighbor cell, the UE may send the D2D signal using a resource common to a resource pool configured in a serving cell. Accordingly, the D2D signal can be efficiently transmitted because interference with the serving cell can be reduced and interference from neighbor cells can also be reduced.

DESCRIPTION OF EXEMPLARY EMBODIMENTS

Figure 1:
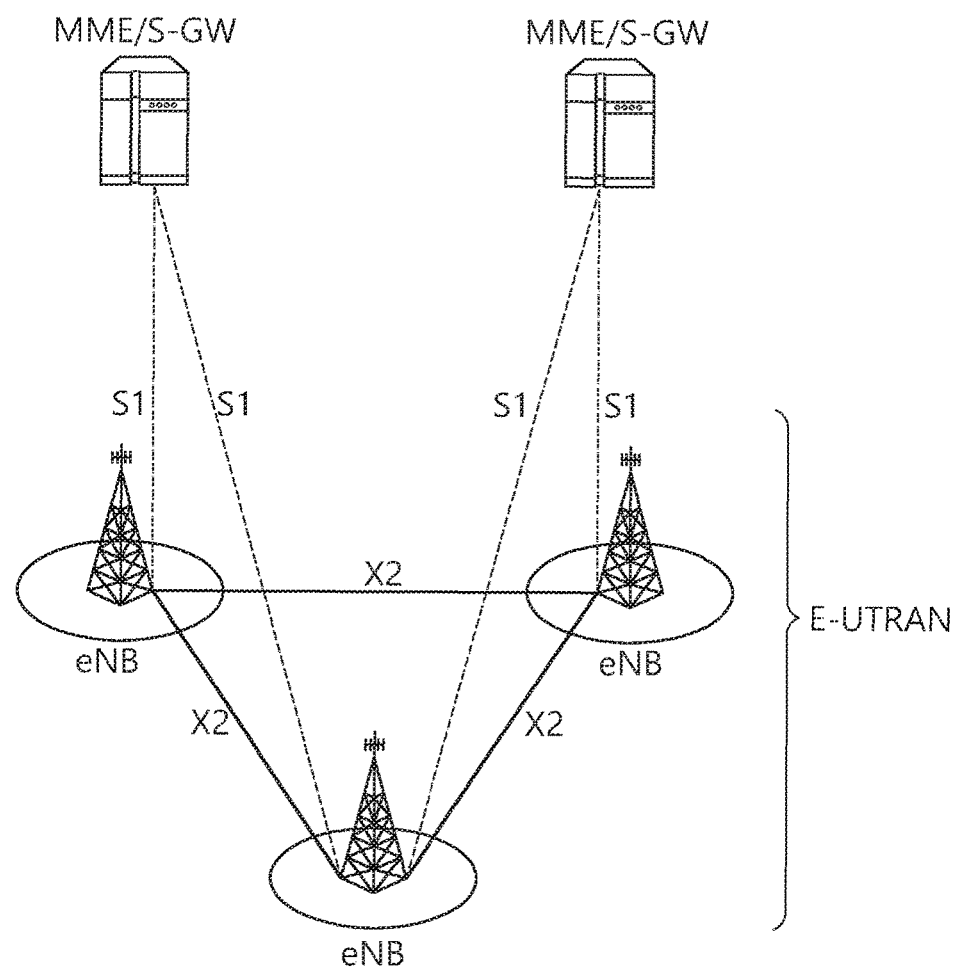
FIG. 1 is a diagram showing the network configuration of an Evolved Universal Terrestrial Radio Access Network (E-UTRAN) which is an example of a mobile communication system.

FIG. 1 is a diagram showing the network configuration of an Evolved Universal Terrestrial Radio Access Network (E-UTRAN) which is an example of a mobile communication system. The E-UTRAN system is a system evolved from an existing UTRAN system. In 3GPP, a basic standardization task for the E-UTRAN system is in progress. The E-UTRAN system is also called a Long Term Evolution (LTE) system.

An E-UTRAN includes e-NodeBs (eNBs or base stations). The eNBs are connected through X2 interfaces. The eNB is connected to User Equipment (hereinafter abbreviated as UE) through a radio interface and connected to an Evolved Packet Core (EPC) through an S1 interface.

The EPC consists of a Mobility Management Entity (MME), a Serving-Gateway (S-GW), and a Packet Data Network-Gateway (PDN-GW). The MME has information about the access of UE and information about the capability of UE. Such information is chiefly used in the mobility management of UE. The S-GW is a gateway having the E-UTRAN as an end point. The PDN-GW is a gateway having the PDN as an end point.

The layers of a radio interface protocol between UE and the network may be divided into L1 (a first layer), L2 (a second layer), and L3 (a third layer) based on the lower 3 layers of an Open System Interconnection (OSI) reference model which is widely known in communication systems. A physical layer that belongs to the lower 3 layers and belongs to the first layer provides information transfer services using physical channels. A Radio Resource Control (hereinafter abbreviated as RRC) layer that belongs to the lower 3 layers and is placed in the third layer functions to control radio resources between UE and the network. To this end, the RRC layer exchanges RRC messages between the UE and the eNB.

Figure 2:
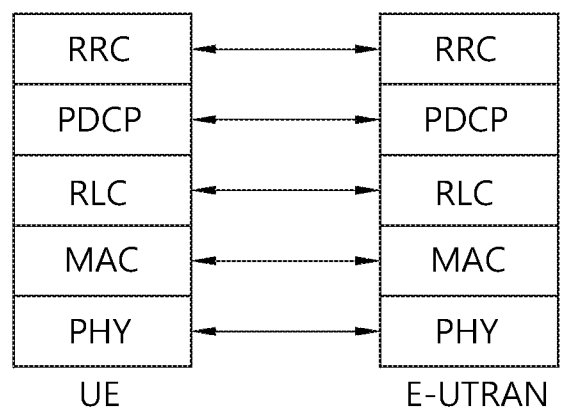
FIG. 2 is a block diagram showing radio protocol architecture for a user plane.
Figure 3:
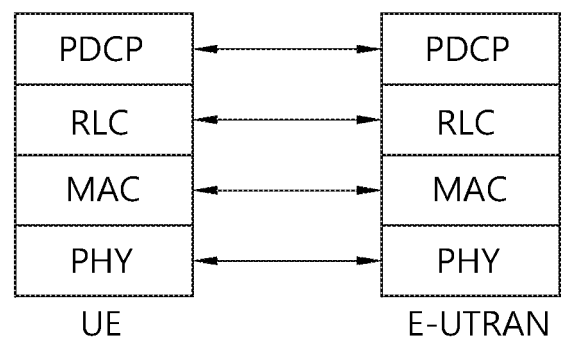
FIG. 3 is a block diagram showing radio protocol architecture for a control plane.

FIG. 2 is a block diagram showing radio protocol architecture for a user plane. FIG. 3 is a block diagram showing radio protocol architecture for a control plane. The data plane is a protocol stack for user data transmission, and the control plane is a protocol stack for control signal transmission.

Referring to FIGS. 2 and 3, a physical (PHY) layer provides a higher layer with information transfer service using a physical channel. The PHY layer is connected to a Medium Access Control (MAC) layer, that is, a higher layer, through a transport channel Data is moved between the MAC layer and the PHY layer through a transport channel. The transport channel is sorted depending on how data is transmitted according to which characteristics through a radio interface.

Data is moved between different PHY layers, that is, between the PHY layers of a transmitter and a receiver through a physical channel. The physical channel may be modulated according to an Orthogonal Frequency Division Multiplexing (OFDM) method and uses time and frequencies as radio resources.

The functions of the MAC layer include mapping between a logical channel and a transport channel and multiplexing/demultiplexing to a transport block that is provided to a physical channel on a transport channel of an MAC Service Data Unit (SDU) belonging to a logical channel. The MAC layer provides service to a Radio Link Control (RLC) layer through a logical channel.

The functions of the RLC layer include the concatenation, segmentation, and reassembly of RLC SDUs. In order to guarantee various types of Quality of Service (QoS) required by a Radio Bearer (RB), the RLC layer provides three types of operation mode, such as Transparent Mode (TM), Unacknowledged Mode (UM), and Acknowledge Mode (AM). The RLC layer provides error correction through automatic repeat request (ARQ).

The function of a Packet Data Convergence Protocol (PDCP) layer in the user plane includes the transfer, header compression, and ciphering of user data. The function of the PDCP layer in the user plane includes the transfer and encryption/integrity protection of control plane data.

The Radio Resource Control (RRC) layer is defined in the control plane only. The RRC layer is related to the configuration, reconfiguration, and release of radio bearers, and is responsible for control of logical channels, transport channels, and PHY channels. An RB means a logical route that is provided by the first layer (PHY layer) and the second layers (the MAC layer, the RLC layer, and the PDCP layer) in order to transfer data between UE and a network.

What an RB is configured means a process of defining the characteristics of a wireless protocol layer and channels in order to provide a specific service and of configuring each detailed parameter and operating method. An RB may be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of the E-UTRAN, UE is in an RRC_CONNECTED state. If not, the UE is in an RRC_IDLE state.

A downlink transport channel through which data is transmitted from a network to UE includes a broadcast channel (BCH) through which system information is transmitted and a downlink shared channel (SCH) through which user traffic or a control message is transmitted. Traffic or a control message for downlink multicast or broadcast service may be transmitted through a downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), a multicast traffic channel (MTCH) and so on.

A physical channel includes several OFDM symbols in a time domain and several subcarriers in a frequency domain. One subframe includes a plurality of OFDM symbols in the time domain. An RB is a resources assignment unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

An RRC state and RRC connection method of UE are described below.

The RRC state means whether or not the RRC layer of UE is logically connected to the RRC layer of the E-UTRAN. A case where the RRC layer of UE is logically connected to the RRC layer of the E-UTRAN is referred to as an RRC_CONNECTED state. A case where the RRC layer of UE is not logically connected to the RRC layer of the E-UTRAN is referred to as the RRC_IDLE state. The E-UTRAN may check the existence of corresponding UE in the RRC_CONNECTED state in each cell because the UE has RRC connection, so the UE may be effectively controlled. In contrast, the E-UTRAN is unable to check UE in the RRC_IDLE state, and a Core Network (CN) manages UE in the RRC_IDLE state in each tracking area, that is, the unit of an area greater than a cell. That is, the existence or non-existence of UE in the RRC_IDLE state is checked only for each large area. Accordingly, the UE needs to shift to the RRC_CONNECTED state in order to be provided with common mobile communication service, such as voice or data.

When a user first turns on UE, the UE first searches for a proper cell and remains in the RRC_IDLE state in the corresponding cell. The UE in the RRC_IDLE state establishes RRC connection with an E-UTRAN through an RRC connection procedure when it is necessary to set up the RRC connection, and shifts to the RRC_CONNECTED state. A case where UE in the RRC_IDLE state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009 September) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Proximity services (ProSe) are described below.

The ProSe is a concept which may include D2D communication. Hereinafter, the ProSe may be interchangeably used along with D2D.

ProSe direct communication refers to communication performed between two or more types of adjacent UE. The types of UE may perform communication using the protocol of the user plane. ProSe-enabled UE means UE supporting a procedure related to the requirements of ProSe. Unless otherwise described, the ProSe-enabled UE includes both public safety UE and non-public safety UE. The public safety UE is UE supporting both a function specified for public safety and a ProSe process. The non-public safety UE is UE supporting a ProSe process, but not supporting a function specified for public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Figure 4:
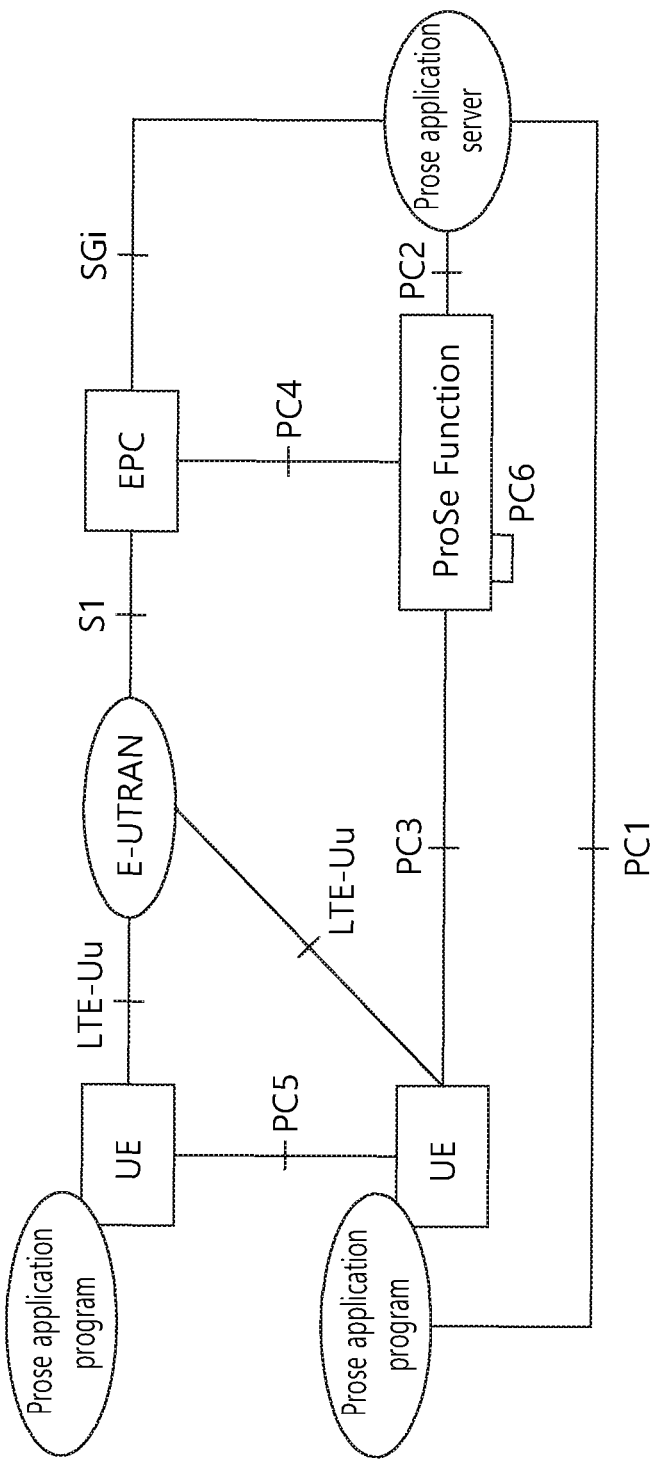
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication: ProSe Direct Communication>.

ProSe direct communication is communication mode in which two types of public safety UE can perform direct communication through a PC 5 interface. The communication mode may be supported when UE is supplied with service within coverage of the E-UTRAN or when UE deviates from coverage of the E-UTRAN.

Figure 5:
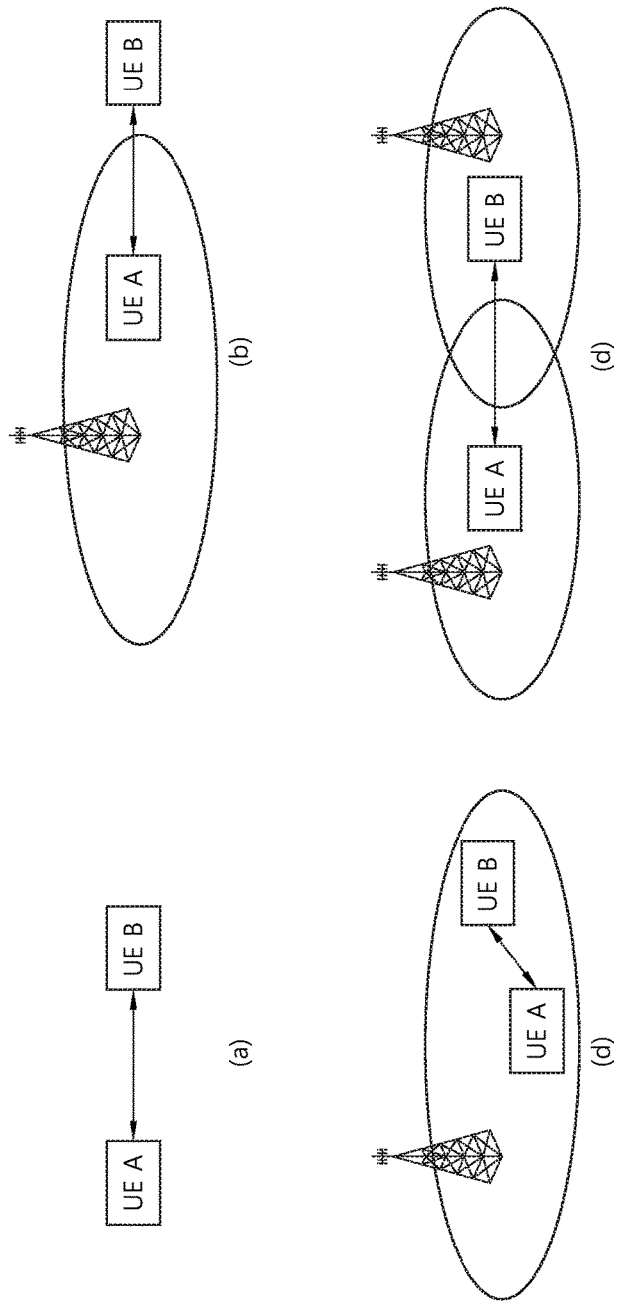
FIG. 5 shows examples in which types of UE performing ProSe direct communication and cell coverage are deployed.

FIG. 5 shows examples in which types of UE performing ProSe direct communication and cell coverage are deployed.

Referring to FIG. 5(*a*), types of UE A and B may be placed outside cell coverage. Referring to FIG. 5 (*b*), UE A may be placed within cell coverage, and UE B may be placed outside cell coverage. Referring to FIG. 5(*c*), both types of UE A and B may be placed within single cell coverage. Referring to FIG. 5(*d*), UE A may be placed within coverage of a first cell, and UE B may be placed within coverage of a second cell.

ProSe direct communication may be performed between types of UE placed at various positions as shown in FIG. 5.

Meanwhile, the following IDs may be used in ProSe direct communication.

A source layer-2 ID: this ID identifies the transmitter of a packet in the PC 5 interface.

A destination layer-2 ID: this ID identifies the target of a packet in the PC 5 interface.

An SA L1 ID: this ID is an ID in Scheduling Assignment (SA) in the PC 5 interface.

Figure 6:
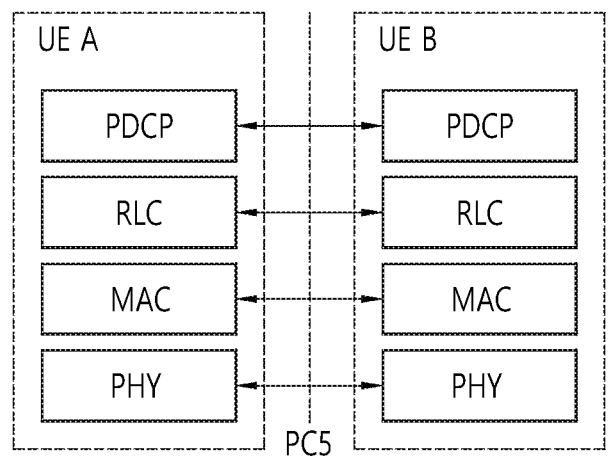
FIG. 6 shows a user plane protocol stack for ProSe direct communication.

FIG. 6 shows a user plane protocol stack for ProSe direct communication.

Referring to FIG. 6, the PC 5 interface includes PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>.

ProSe-enabled UE may use the following two types of mode for resource assignment for ProSe direct communication.

1. Mode 1

Mode 1 is mode in which resources for ProSe direct communication are scheduled by an eNB. In order for UE to send data in accordance with mode 1, the UE needs to be in the RRC_CONNECTED state. The UE requests a transmission resource from an eNB, and the eNB schedules resources for scheduling assignment and data transmission. The UE sends a scheduling request to the eNB and may send a ProSe Buffer Status Report (BSR). The eNB determines that UE has data on which ProSe direct communication will be performed and requires a resource for the transmission of the data based on the ProSe BSR.

2. Mode 2

Mode 2 is mode in which UE directly selects a resource. UE directly selects a resource for ProSe direct communication in a resource pool. The resource pool may be configured by a network or may be previously determined.

Meanwhile, if UE has a serving cell, that is, if the UE is in the RRC_CONNECTED state with an eNB or the UE in the RRC_IDLE state is placed in a specific cell, the UE is considered to be placed within coverage of the eNB.

If UE is placed outside coverage, only mode 2 may be applied. If the UE is placed within coverage, the UE may use mode 1 or mode 2 depending on a configuration of an eNB.

If another exception condition is not present, only when an eNB performs a configuration, UE may change its mode from mode 1 to mode 2 or from mode 2 to mode 1.

<ProSe Direct Discovery>

ProSe direct discovery refers to a procedure used by ProSe-enabled UE in order to discover another proximity ProSe-enabled UE and is also called D2D direct discovery. In this case, E-UTRA radio signals through the PC 5 interface may be used. Information used in the ProSe direct discovery is hereinafter called discovery information.

Figure 7:
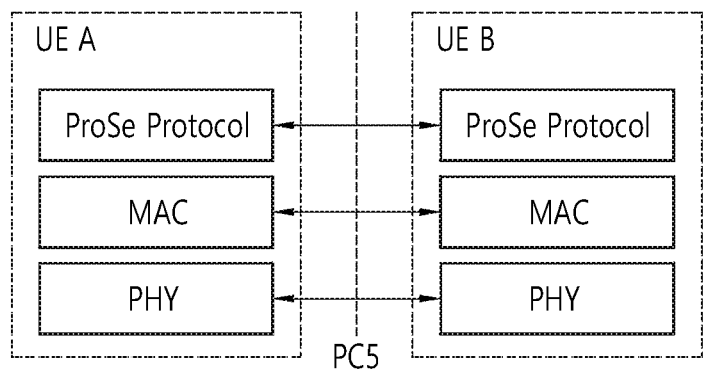
FIG. 7 shows the PC 5 interface for D2D direct discovery.

FIG. 7 shows the PC 5 interface for D2D direct discovery.

Referring to FIG. 7, the PC 5 interface includes an MAC layer, a PHY layer, and a ProSe Protocol layer that is a higher layer. The permission of the announcement and monitoring of discovery information is handled by the higher layer (the ProSe Protocol). The contents of discovery information are transparent to an Access Stratum (AS). A ProSe protocol allows only valid discovery information to be delivered to the AS for announcement.

The MAC layer receives discovery information from the higher layer (the ProSe protocol). An IP layer is not used for the transmission of discovery information. The MAC layer determines resources which are used to announce discovery information received from the higher layer. The MAC layer produces a MAC Protocol Data Unit (PDU) on which discovery information is carried and sends the MAC PDU to the physical layer. An MAC header is not added.

For the announcement of discovery information, there are two types of resource assignment.

1. Type 1

This is a method for assigning resources for the announcement of discovery information not in a UE-specific way. An eNB provides types of UE with a resource pool configuration for discovery information announcement. This configuration may be signaled as an SIB.

UE autonomously selects a resource from an instructed resource pool and announces discovery information using the selected resource. The UE may announce the discovery information through a resource randomly selected during each discovery period.

2. Type 2

This is a method for assigning resources for the announcement of discovery information in a UE-specific way. UE in the RRC_CONNECTED state may request resources for discovery signal announcement from an eNB through an RRC signal. The eNB may assign the resources for discovery signal announcement through the RRC signal. Resources for monitoring a discovery signal may be assigned within a resource pool configured in types of UE.

An eNB may announce 1) a type 1 resource pool for discovery signal announcement to UE in the RRC_IDLE state through SIB. Types of UE whose ProSe direct discovery has been permitted uses the type 1 resource pool for discovery information announcement in the RRC_IDLE state. Alternatively, the eNB announces 2) that it supports ProSe direct discovery through SIB, but may not provide resources for discovery information announcement. In this case, UE needs to enter the RRC_CONNECTED state for the discovery information announcement.

An eNB may configure whether UE in the RRC_CONNECTED state has to use the type 1 resource pool or the type 2 resource pool for discovery information announcement through an RRC signal with respect to the UE.

Figure 8:
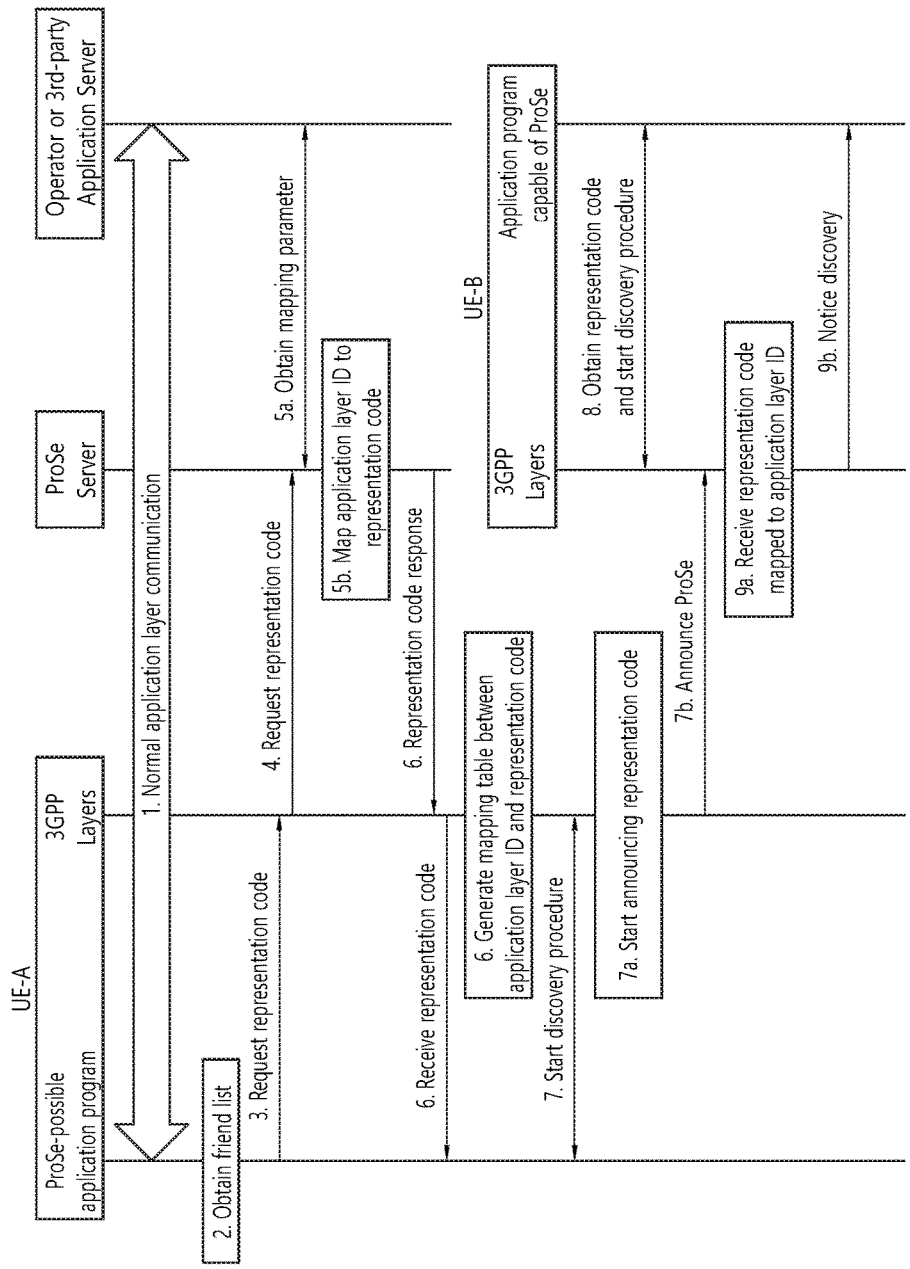
FIG. 8 is an embodiment of a ProSe discovery process.

FIG. 8 is an embodiment of a ProSe discovery process.

Referring to FIG. 8, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 8, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 8 may also be called a single step discovery procedure.

Figure 9:
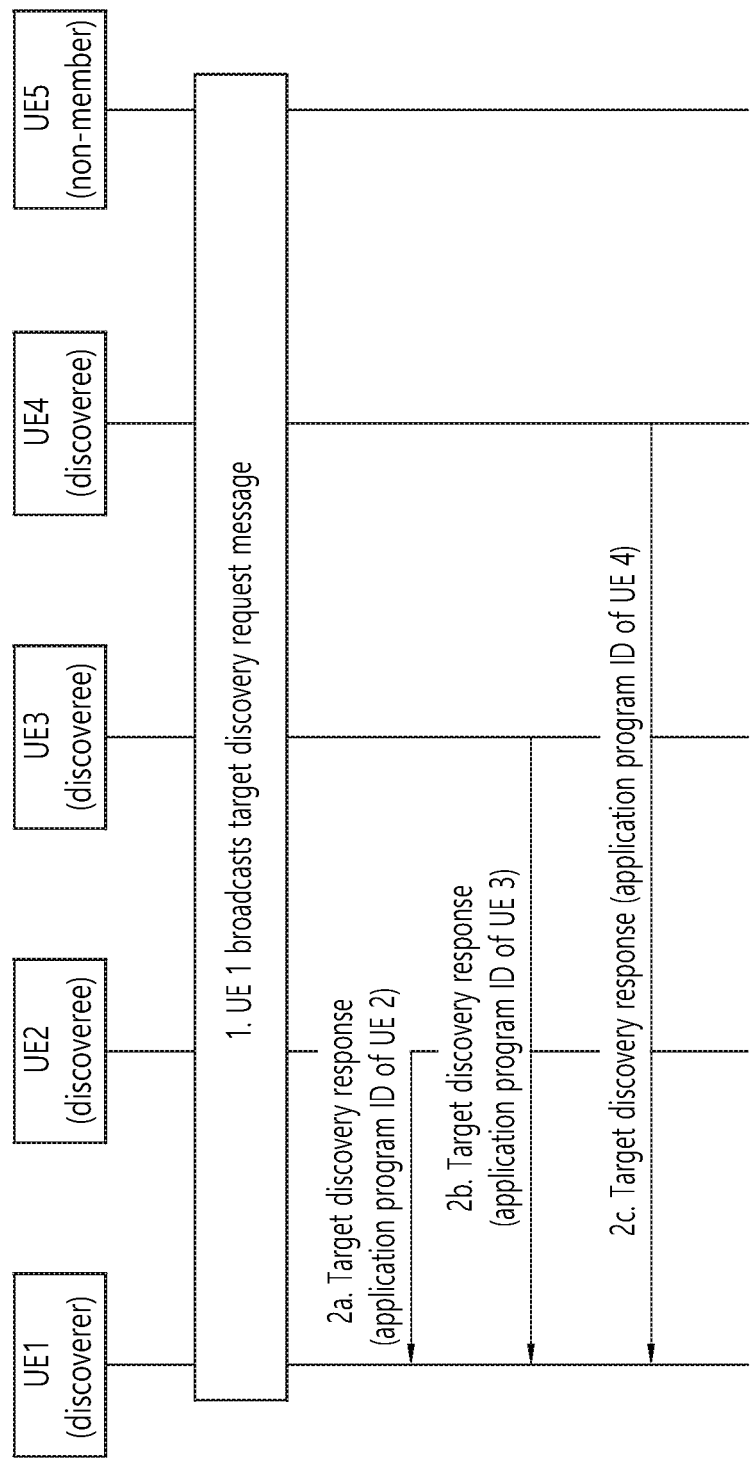
FIG. 9 is another embodiment of a ProSe discovery process.

FIG. 9 is another embodiment of a ProSe discovery process.

In FIG. 9, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 9 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 9 may be called a 2-step discovery procedure.

In addition to the discovery procedure described in FIG. 9, if the UE 1 (the discoverer) sends a discovery conform message (may be hereinafter abbreviated as an M3), that is, a response to the target discovery response message, this may be called a 3-step discovery procedure.

The present invention is described below. Hereinafter, D2D transmission may mean the transmission of signals in ProSe direct communication or ProSe direct discovery.

Figure 10:
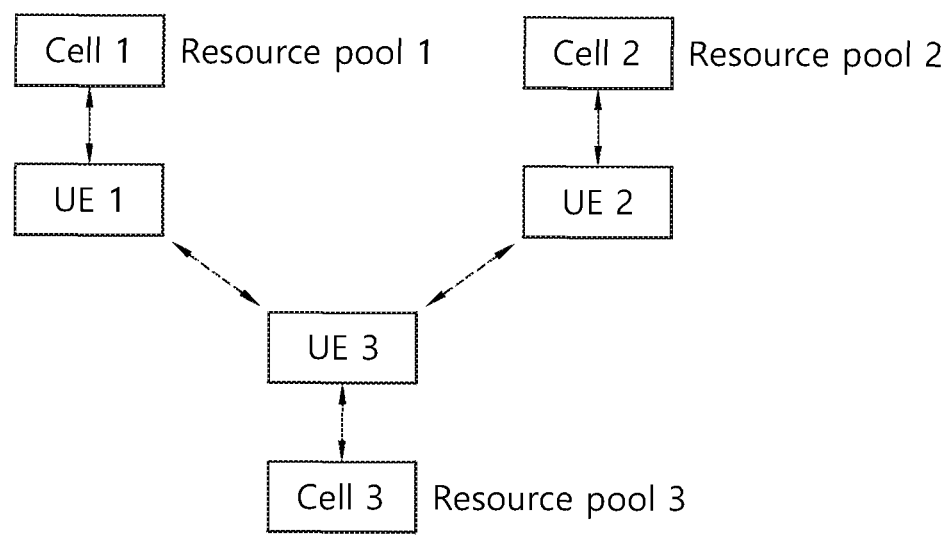
FIG. 10 illustrates problems in D2D transmission.

FIG. 10 illustrates problems in D2D transmission.

Referring to FIG. 10, a cell 1 is the serving cell of UE 1, a cell 2 is the serving cell of UE 2, and a cell 3 is the serving cell of UE 3. The cells 1 and 2 may be cells neighboring the UE 3.

It is assumed that a resource pool 1 has been configured for D2D transmission in the cell 1, a resource pool 2 has been configured for D2D transmission in the cell 2, and a resource pool 3 has been configured for D2D transmission in the cell 3. The resource pool may be resources in which transmission between the serving cell and the UE is limited and which has been reserved for D2D transmission.

If the UE 3 attempts to perform D2D transmission on the UE 1 or the UE 2, it is unclear that the UE 3 has to use which resource. Furthermore, if the UE 3 selects/uses the resource pool of the cell 1 or cell 2, that is, a neighbor cell, for D2D signal transmission, there is a problem in that interference with the cell 3, that is, the serving cell of the UE 3, is caused if the resource pool of the cell 1 or the cell 2 is different from the resource pool of the cell 3.

Figure 11:
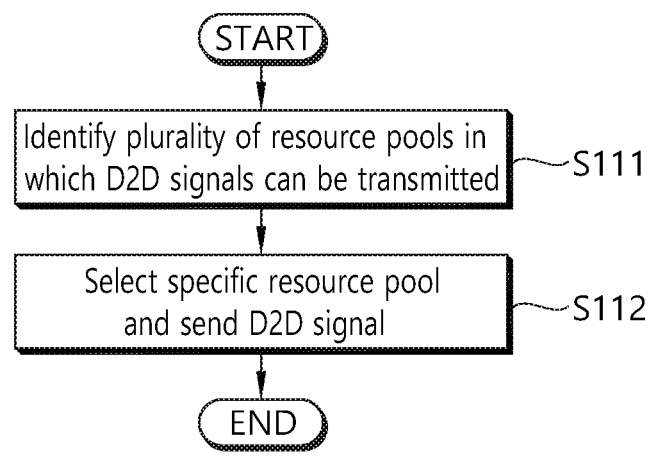
FIG. 11 shows a device to device (D2D) signal transmission method of UE according to an embodiment of the present invention.

FIG. 11 shows a device to device (D2D) signal transmission method of UE according to an embodiment of the present invention.

Referring to FIG. 11, UE identifies a plurality of resource pools in which D2D signals may be transmitted (S111). The UE selects a specific resource pool from the plurality of identified resource pools and sends a D2D signal through the selected resource pool (S112). How the specific resource pool will be selected is described later.

The UE may be provided with information about the resource pool to be used for the transmission of the D2D signal. Hereinafter, information that announces a resource pool to be used for D2D signal transmission is called resource selection information.

The resource selection information may announce the cell identity (ID) of each cell and a resource pool configured in each cell. For example, the resource selection information may include the following contents.

1. A resource pool configured in a serving cell, 2. A resource pool configured in a neighbor cell 1, and 3. A resource pool configured in a neighbor cell K.

Meanwhile, the resource selection information may include all of the resource pools 1 to 3, but may include some of the resource pools 1 to 3. For example, resource selection information that announces a resource pool configured in a serving cell may be received from the serving cell, and resource selection information that announces a resource pool configured in a neighbor cell may be received from a neighbor cell.

Furthermore, the resource selection information may further include 4. the results of measurement for each ell.

Hereinafter, various methods for selecting a specific resource pool to be used for D2D signal transmission are described.

Figure 12:
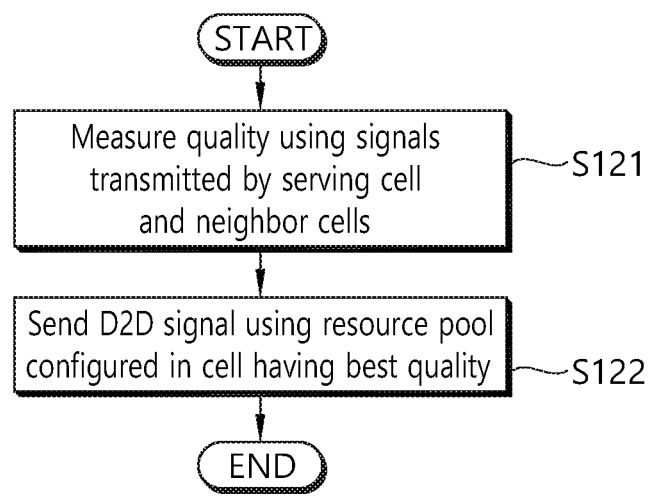
FIG. 12 is a first embodiment in which a specific resource pool to be used for D2D signal transmission is selected.

FIG. 12 is a first embodiment in which a specific resource pool to be used for D2D signal transmission is selected.

Referring to FIG. 12, UE measures quality of cells using signals transmitted by a serving cell and neighbor cells (S121). For example, Reference Signal Received Power (RSRP) may be measured by measuring a reference signal transmitted by each cell.

The UE sends a D2D signal using a resource pool configured in a cell having the best quality (S122).

Meanwhile, FIG. 12 has illustrates the case where the UE directly selects a specific cell by measuring quality of cells, but is not limited thereto. That is, the UE may use the measurement results of each cell included in resource selection information.

Figure 13:
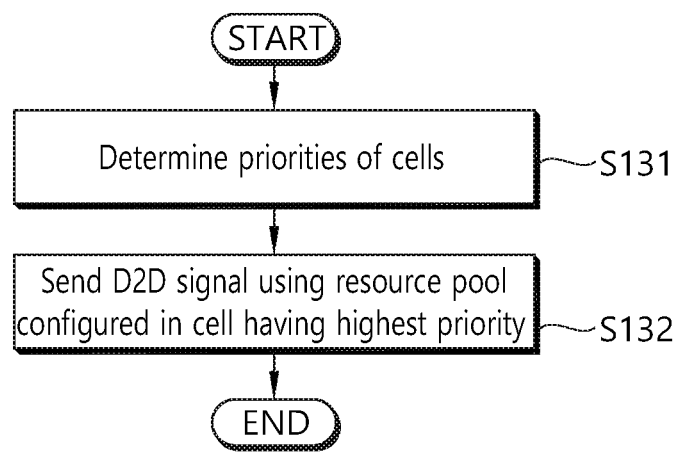
FIG. 13 is a second embodiment in which a specific resource pool to be used for D2D signal transmission is selected.

FIG. 13 is a second embodiment in which a specific resource pool to be used for D2D signal transmission is selected.

Referring to FIG. 13, UE determines the priorities of cells (S131). The priorities of the cells may have been previously known to the UE or may be received from another UE or priority information may be separately received from a network.

The UE sends a D2D signal using a resource pool configured in a cell having the highest priority (S132).

Meanwhile, the UE may send the D2D signal using the following method.

First, the UE determines the priority of the resource pool. The priority of the resource pool may have been previously known to the UE or the UE may be aware of the priority of the resource pool by receiving priority information from a network.

Furthermore, the UE determines the priority of the D2D signal to be transmitted. For example, if the D2D signal includes a discovery signal related to ProSe direct discovery and data related to ProSe direct communication, the discovery signal and the data may have different priorities.

Meanwhile, the priority of the D2D signal may be associated with the priority of the resource pool. For example, assuming that a set of priorities of D2D signals to be transmitted by UE is M and a set of priorities of resource pools is N, an element of the set M corresponds to a specific elements of the set N (M->N).

D2D signals of different priorities may be associated with a resource pool having the same priority. For example, both a discovery signal and data may be associated with a resource pool 1. Furthermore, both the discovery signal and the data may be associated with a resource pool 2. In this case, as if the discovery signal has higher priority with respect to the resource pool 1 and the data has higher priority with respect to the resource pool 2, the priorities of the same D2D signals may be different set in the respective resource pools. Alternatively, the same D2D signals in each resource pool may have the same priority.

Different D2D signals having different priorities may be associated with resource pools having different priorities. For example, resource pools 1 and 2 may have different priorities, and a discovery signal and data may have different priorities. In this case, a configuration may be performed so that only the discovery signal is associated with the resource pool 1 and only the data is associated with the resource pool 2.

An association between the priority of the D2D signal and the priority of the resource pool may be previously known to UE or the UE may be aware of the priority of the resource pool by receiving it from a network.

The UE sends the D2D signal using a resource pool associated with the priority of the D2D signal to be transmitted.

Figure 14:
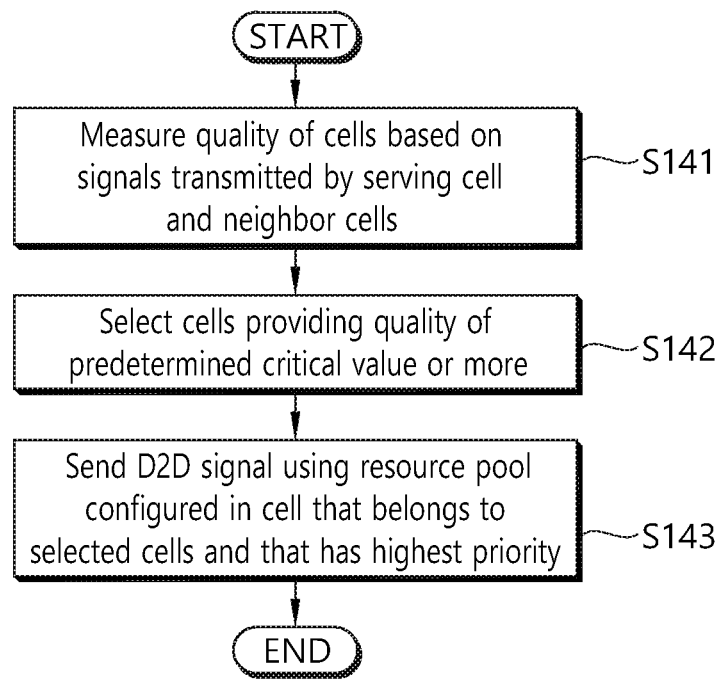
FIG. 14 is a third embodiment in which a specific resource pool to be used for D2D signal transmission is selected.

FIG. 14 is a third embodiment in which a specific resource pool to be used for D2D signal transmission is selected.

Referring to FIG. 14, UE measures quality of cells based on signals transmitted by a serving cell and neighbor cells (S141). For example, the UE may measure reference signal received power by measuring a reference signal transmitted by each cell.

The UE selects cells providing quality of a predetermined critical value or more (S142). For example, the UE may select N cells. In this case, the value N may be set by a network or may be a predetermined value.

The UE sends a D2D signal using a resource pool configured in a cell that belongs to the selected cells and that has the highest priority (S143).

Meanwhile, in the first embodiment to the third embodiment, the selected specific cell may be a neighbor cell. For example, in the first embodiment, a cell having the best quality (a cell having the highest reference signal received power) may be a neighbor cell. In the second embodiment, a cell having the highest priority may be a neighbor cell. In the third embodiment, a cell that belongs to N cells providing quality of a critical value or more and that has the highest priority may be a neighbor cell. In this case, UE may send a D2D signal using resources (i.e., overlapped resources) that are common to a resource pool configured in a serving cell and resource pool configured in the neighbor cell.

For example, in FIG. 10, if the cell 1 is a cell having the highest received power as a result of the measurement of reference signal received power of the UE 3, the UE 3 sends the D2D signal using resources (i.e., overlapped resources)

that are common to the resource pool 3 configured in the cell 3 and the resource pool 1 configured in the cell 1. Accordingly, the D2D signal transmitted by the UE 3 can reduce the influence of interference with the cell 3 attributable to the serving cell of the UE 3 and also reduce interference from the cell 1. From the viewpoint of the UE 3, what the cell 1 is a cell having the best quality means that the UE 3 may experience great interference attributable to the resources through which the cell 1 sends the signal to the UE 1. In the resource pool 1 of the cell 1, the cell 1 and the UE 1 may not communicate with each other. Accordingly, if the UE 3 uses the resource pool 1, interference from the cell 1 is reduced.

Meanwhile, UE may determine whether resources overlap or not based on the timing boundaries of two related cells, for example, a subframe boundary. If a difference between the time boundaries of the two related cells is within a predetermined permission value, it is assumed that the time boundaries have been arranged and overlapped. If a difference between the time boundaries of the two related cells is greater than a predetermined permission value, it is assumed that the time boundaries have not been arranged and overlapped.

If a network permits UE to send a D2D signal without taking into consideration whether the resource pool of a reference cell overlaps a specific resource pool, the UE may send the D2D signal using a specific resource of a selected resource pool. The reference cell may mean a serving cell.

Figure 15:
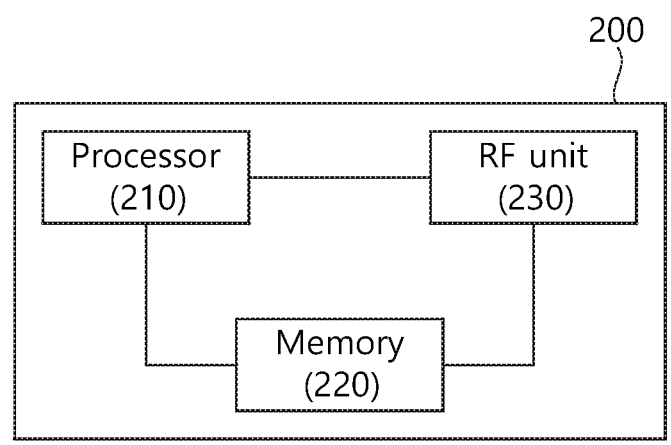
FIG. 15 is a block diagram showing a wireless device in which the embodiments of the present invention are implemented.

FIG. 15 is a block diagram showing a wireless device in which the embodiments of the present invention are implemented. The device implements UE operations according to the methods described with reference to FIGS. 11 to 14.

The wireless device 200 includes a processor 210, memory 220, and a Radio Frequency (RF) unit 1430. The processor 210 implements the proposed functions, processes and/or methods. For example, the processor 210 identifies a plurality of resource pools in which D2D signals may be transmitted, selects a specific resource pool from the plurality of resource pools, and sends a D2D signal a resource of the selected specific resource pool. The embodiments of FIGS. 11 to 14 may be implemented by the processor 210 and the memory 220. The RF unit 230 is connected to the processor 210 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for transmitting a device to device (D2D) signal in a wireless communication system, the method performed by a user equipment (UE) and comprising:
measuring received power of signals transmitted by a serving cell and neighbor cells;
selecting a specific resource pool from among a plurality of resource pools capable of transmitting D2D signals based on the measuring; and
transmitting the D2D signal using a resource of the selected specific resource pool based on the selecting,
wherein the selected specific resource pool is a resource pool configured in a cell, of the serving cell and the neighbor cells, that has a highest received power.

2. The method of claim 1, further comprising receiving resource selection information indicative of the plurality of resource pools.

3. The method of claim 1, wherein each of the plurality of resource pools is a resource pool configured in each cell in order to send a D2D signal.

4. The method of claim 1, wherein when the cell having the highest received power is a first neighbor cell of the neighbor cells, the D2D signal is transmitted using resources common to a resource pool configured in the serving cell and a resource pool configured in the first neighbor cell.

5. The method of claim 1, wherein:
each of the plurality of resource pools has priority, and
the selected specific resource pool is a resource pool having a highest priority.

6. The method of claim 5, wherein priorities of the plurality of resource pools are determined based on priorities of cells in which respective resource pools have been configured.

7. The method of claim 1, further comprising:
selecting cells transmitting signal having received power of a predetermined critical value or more based on the measuring.

8. The method of claim 7, wherein the selected specific resource pool is a resource pool configured in a cell which belongs to the cells transmitting signal having the received power of the predetermined critical value or more and which has a highest priority.

9. The method of claim 1, wherein:
the plurality of resource pools have priorities, and
when the D2D signals comprise a plurality of types, different types of the D2D signals have different priorities.

10. The method of claim 9, wherein the priorities of the plurality of resource pools and the priorities of the D2D signals are associated.

11. A user equipment (UE) comprising:
a Radio Frequency (RF) transceiver that transmits and receives radio signals; and
a processor operatively connected to the RF transceiver, wherein the processor is configured to:
measure received power of signals transmitted by a serving cell and neighbor cells;
select a specific resource pool from among a plurality of resource pools capable of transmitting D2D signals based on the measure of the received power of signals; and
transmit the D2D signal using a resource of the selected specific resource pool based on the select the specific resource pool,
wherein the selected specific resource pool is a resource pool configured in the cell, of the serving cell and the neighbor cells, that has a highest received power.

* * * * *